Dec. 21, 1926. 1,611,489
P. D. SATCHWELL
CHART AND INSTRUMENT FOR EXPEDITING THE MOVEMENT OF MATERIAL, GOODS, WARES, AND MERCHANDISE
Filed Jan. 2, 1926  2 Sheets-Sheet 1

THE FORESIGHT SYSTEM
TRANSPORTATION EXPEDITING INSTRUMENT.
PATENT APPLIED FOR.
KIND OF MATERIAL _____
AMOUNT OF MATERIAL _____
JOB, _____
PLACE OF DELIVERY _____
_____ SIDING,
_____ RAILROAD DELIVERY
NOT LATER THAN _____

OFFICE OF TRAFFIC MANAGER.

TRAFFIC MANAGER.
NOTE. THE PRACTICE OF FOSTERING RIVALRY BY GIVING COMPETITIVE CARRIERS AN OPPORTUNITY TO COMPETE IN BIDDING FOR THE BUSINESS BEFORE FINALLY TENDERING SHIPMENT TO SELECTED INITIAL CARRIER HAS BEEN FOUND TO BE PRODUCTIVE OF BEST RESULTS.

GENTLEMEN: _____
REFERENCE IS MADE TO THIS COMPANY'S PURCHASING DEPARTMENT'S LETTER OF _____ RELATIVE TO BEING IN THE MARKET FOR _____
_____ (MATERIAL ITEMIZED ON SHEET AND DESCRIBED IN DRAWINGS AND SPECIFICATION SENT YOU) FOR USE IN CONNECTION WITH CONTRACT ON THE ABOVE-INDICATED JOB.
CONDITIONED UPON THE SHIPPER'S ACTIVE COOPERATION IN THE PROPER AND PROMPT USE OF THIS SYSTEM, THE UNDERSIGNED TRAFFIC MANAGER WILL UNDERTAKE TO ASSIST IN EXPEDITING THE TRANSIT OF THE MATERIAL REFERRED TO, IT BEING EXPRESSLY UNDERSTOOD, HOWEVER, THAT SUCH SERVICE OF ASSISTANCE WILL NOT IN ANY WAY MODIFY THE CONTRACTUAL RELATIONSHIP BETWEEN THE SHIPPER AND THIS COMPANY OR BETWEEN THE SHIPPER AND THE CARRIERS.
YOU WILL PLEASE THEREFORE FILL OUT SPACES BELOW IN STRICT ACCORDANCE WITH INSTRUCTIONS PRINTED ON BACK HEREOF.
RESPECTFULLY,

_____ TRAFFIC MANAGER.

1. DATE WHEN SHIPMENT WILL BE MADE _____
2. POINT FROM WHICH SHIPMENT WILL BE MADE _____
3. (A) APPROXIMATE NUMBER OF CARS REQUIRED FOR SHIPMENT _____
   (B) WHETHER ADEQUATE CAR SUPPLY WILL BE AVAILABLE _____
   (C) ANY PROSPECT OF DELAY IN TRANSIT ON ACCOUNT OF EMBARGOES, CONGESTIONS, ETC., _____
   (D) NAMES OF INITIAL CARRIER AND CONNECTIONS LIKELY TO BE FAVORED WITH SHIPMENT _____
4. CONSIGNOR _____
5. CONSIGNEE _____
6. NAMES, TITLES AND ADDRESSES OF CARRIERS' REPRESENTATIVES WHO WILL TRACE BY WIRE THE SHIPMENT THROUGH TO PLACE OF DELIVERY, ADVISING PROMPTLY THE ABOVE-INDICATED TRAFFIC MANAGER BY "CAR" WIRE OR MAIL FORWARDING REFERENCE OF SHIPMENT, WHICH, FOR CONVENIENCE AND BREVITY, MAY BE DESIGNATED AS ORDER _____, AND WILL KEEP HIM ADVISED DAILY OF MOVEMENTS:

_____

7. SHIPMENT: _____
8. INITIALS AND NUMBERS OF CARS _____
9. HOUR AND DATE FORWARDED _____
10. IN CASE OF L.C.L. SHIPMENT, BILLING REFERENCE AND WHERE LOADED TO BREAK-BULK _____
11. ROUTING IN FULL: (A) NAME OF INITIAL CARRIER _____
    (B) LINES OF CONNECTING LINES _____
    (C) VIA JUNCTION POINTS _____
RESPECTFULLY,
PLACE _____
DATE _____

PLACE _____ _____ FROG. AGENT,
DATE _____ _____ RAILROAD.

Fig. 1.  Inventor- Paul A. Satchwell

Dec. 21, 1926.
P. D. SATCHWELL
1,611,489
CHART AND INSTRUMENT FOR EXPEDITING THE MOVEMENT OF MATERIAL, GOODS, WARES, AND MERCHANDISE
Filed Jan. 2, 1925   2 Sheets-Sheet 2

Fig. 2.

THE FORESIGHT SYSTEM
TRANSPORTATION EXPEDITING INSTRUMENT.
PATENT APPLIED FOR.

1.      INSTRUCTIONS FOR USE OF THIS SYSTEM.

THE PROSPECTIVE SHIPPER SUBMITTING BID TO THIS COMPANY'S PURCHASING DEPARTMENT FOR THE ORDER REFERRED TO ON THE REVERSE SIDE HEREOF, WILL PROMPTLY FILL OUT SPACES 1 TO 5, INCLUSIVE, ON SHEETS A TO M, INCLUSIVE, MAILING THE ORIGINAL (A) TO THE UNDERSIGNED TRAFFIC MANAGER, AND DELIVERING COPIES B, C AND D TO REPRESENTATIVES OF COMPETITIVE CARRIERS.

THE SHIPPER (THE SUCCESSFUL BIDDER) UPON BEING INFORMED BY THE COMPANY'S PURCHASING DEPARTMENT OF HAVING BEEN AWARDED THE ORDER, WILL THEN PROMPTLY FILL OUT SPACES 6 AND 11 ON THE REMAINING COPIES, NOTIFYING REPRESENTATIVES OF INTERESTED CARRIERS, PROMPTLY MAILING
    COPY E TO THE UNDERSIGNED TRAFFIC MANAGER,
    COPY F TO THIS COMPANY'S PURCHASING DEPARTMENT,
    COPY G TO _____
         (IN CHARGE AT THE JOB) AT_____
AND WILL AT THE SAME TIME TURN OVER
    COPIES H, I, J, K AND L TO THE FORWARDING AGENT OF THE SUCCESSFUL CARRIER, RETAINING THE LAST, COPY M, FOR FILE.

WHEN SHIPMENT IS BILLED OUT, THE FORWARDING AGENT WILL IMMEDIATELY FILL OUT SPACES 7 TO 10, INCLUSIVE, (VERIFYING DATA FILLED IN SPACE No 11) ON COPIES LEFT WITH HIM, DATE AND SIGN AND PROMPTLY MAIL —
    COPY H TO THE UNDERSIGNED TRAFFIC MANAGER,
    COPY I TO THIS COMPANY'S PURCHASING DEPARTMENT, DELIVER
    COPY J TO HIS COMPANY'S "LIVE WIRE" EXPEDITING OFFICIAL WHO WILL BE GOVERNED BY THE CONSIGNOR'S REPRESENTATIONS IN SPACE No. 6,
    COPY K TO BE DELIVERED TO SHIPPER, AND
    COPY L TO BE RETAINED BY HIM, THE FORWARDING AGENT

RESPECTFULLY,

TRAFFIC MANAGER.

Fig. 3.

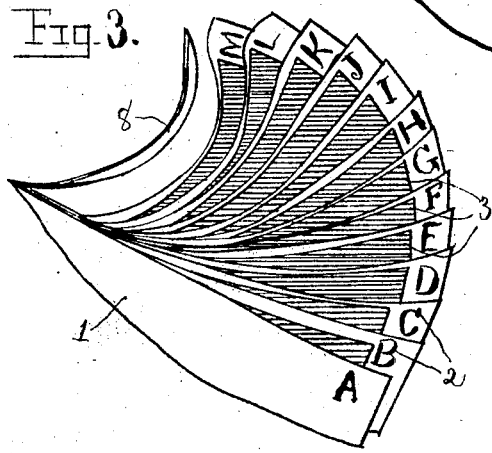

Inventor
Paul D. Satchwell

Patented Dec. 21, 1926.

1,611,489

UNITED STATES PATENT OFFICE.

PAUL D. SATCHWELL, OF WASHINGTON, DISTRICT OF COLUMBIA.

CHART AND INSTRUMENT FOR EXPEDITING THE MOVEMENT OF MATERIAL, GOODS, WARES, AND MERCHANDISE.

Application filed January 2, 1926. Serial No. 79,023.

This invention relates to a system and instrument for the ascertainment of essential advance information preceding the placement by the purchasing department of a purchasing organization of an order for material, goods, wares and merchandise and for expediting the movement thereof, and embodies the novel steps and features hereinafter described and claimed.

An object of the invention is to foster rivalry of competition amongst initial carriers and to provide a system and recording instrument in tabular form to be used in connection therewith for the purpose of enabling the traffic manager of the purchasing organization to ascertain and determine in advance of the placing of an order by the purchasing organization's purchasing department for the purchase of material, etc., as to whether the material supply organization can deliver in ample time the material, etc., contracted for to a selected carrying organization and whether the physical conditions are probably such that the carrying organization can furnish promptly the necessary equipment and make the delivery of the material, etc., in accord with a preformulated schedule, specified in spaces provided, along with commitments as to the material supply organization's capability of making the shipment on a date certain so that the carrier organization may make preparation to provide the necessary equipment and get it to destination not later than the date specified; the point from which shipment will be made; the consignor and consignee; the probable number of cars required; prospect with reference to an adequate car supply; any probability of any delay in transit to result from causes which might then be foreseen, and indentification of the probable initial and connecting carriers, upon certain sheets of the tablet.

A still further object of the invention is to provide in the instrument spaces for the entry of complete forwarding reference commitments to be made by the forwarding agent of the initial carrier of the carrying organization, such commitments including identification of the carrier, identification of the order (which may be used as a symbol when telegraphing), character of the shipment, identification of the cars containing the shipment, hour and date forwarded, billing reference and routing, including identification of the initial carrier, connecting lines and junction points.

In its physical makeup the tablet includes a number of thin sheets, each alphabetically designated, arranged for the insertion of carbon paper and secured together at one end-edge by adhesive material so that the tablet may be run upon the roller of a typewriting machine and the entries which are made on any one sheet reproduced by the carbon paper at corresponding points upon all the other sheets. The sheets are distinguished from each other preferably by alphabetical characters applied to the corner portions thereof and arranged consecutively from A to M. Each sheet bears upon its obverse surface the questions and the spaces for the entry of the commitments. Upon the reverse surface of each sheet there appears instructions as to how the commitment entries are to be made by the material supply organization and the carrier organization or their representatives and as to what disposition is to be made of each individual sheet and as to how the tablet is to be passed between the several organizations during the process of having the commitment entries made thereon.

In the accompanying drawings:

Figure 1 is a plan view of the obverse surface of one of the sheets of the tablet instrument.

Figure 2 is a similar view of the reverse surface thereof.

Figure 3 is a detailed view of features of the invention.

The tablet which forms the recording instrument for the entries of the commitments by the various agencies involved in the execution in the system consists of a number of sheets 1 each having in its upper right hand corner a distinctive alphabetical designating character 2. The said sheets are assembled in tablet form and sheets of carbon paper indicated at 3 are interposed between the adjacent instrument sheets.

Each instrument sheet bears upon its obverse surface a caption indicating the system, spaces for the entries of the identification of the purchasing organization and its officiating traffic manager; spaces for the entries of the character of the material, amount of material; location of the job, place of delivery; identification of siding; identification of the delivering carrier, and stipulation as to the latest date of delivery. This caption is indicated in general at 4.

Each instrument sheet also bears upon its obverse surface instructions and directions indicated at 5 and addressed by the traffic manager of the purchasing organization to a prospective material supply organization.

Each instrument sheet also bears upon its obverse surface a list of questions indicated at 6 and spaces adjacent to each question for the entry of commitments and to be entered therein by the probable material supply organization or its agents.

Each instrument sheet also bears upon its obverse surface a list of questions indicated at 7 and spaces adjacent to each of said questions for the entry of commitments and to be entered therein by the probable carrier or its agents or by the selected carrier or its agents as the case may be. Each instrument sheet also bears upon its obverse surface spaces for the entry of the signatures of the material supply organization and the carrier organization and their active agencies.

Each instrument sheet bears upon its reverse surface instructions for the use of the system, as follows:

"A prospective shipper submitting bid to this company's purchasing department for the order referred to on the reverse side hereof, will promptly fill out spaces 1 to 5 inclusive, on sheets A to M inclusive, mailing the original (A) to the undersigned traffic manager, and delivering copies B, C and D to representatives of competitive carriers. The shipper (the successful bidder) upon being informed by the company's purchasing department of having been awarded the order, will then promptly fill out spaces 6 and 11 on the remaining copies, notifying representatives of interested carriers, promptly mailing Copy E to the undersigned traffic manager,
Copy F to this company's purchasing department,
Copy G to _____,
(in charge at the job)
at _____;
and will at the same time turn over
Copies H, I, J, K and L to the forwarding agent of the successful carrier, retaining the last, copy M, for file.

When shipment is billed out, the forwarding agent will immediately fill out spaces 7 to 10, inclusive, (verifying data filled in spaces No. 11) on copies left with him, date and sign and promptly mail—

Copy H to the undersigned traffic manager,
Copy I to this company's purchasing department, deliver
Copy J to his company's "live wire" expediting official who will be governed by the consignor's representations in space No. 6,
Copy K to be delivered to the shipper, and
Copy L to be retained by him, the forwarding agent.
Respectfully,
Traffic Manager."

This is a foresight system for facilitating the ascertainment of essential information in advance of the placement of an order by the purchasing organization's purchasing department with a material supply organization as to the ability of the latter to furnish the material, etc., in ample time to the carrying organization so that it can get same to destination within the time specified. It also provides means for obtaining from the carrier commitments as to the details of shipping and delivering facilities for following up and expediting shipment by the traffic manager.

This system further provides means for informing the carrying organization as to what the material supply organization is commited to do and it also provides means for informing the material supply organization as to what the carrier organization commits itself to do in the transaction of the furnishing of equipment and of the movement of the material, etc.

Having described the invention, what is claimed is:

1. An instrument for use in the expediting of the movement of material, comprising a plurality of sheets having means to distinguish one from another, each of said sheets bearing data adapted to register with that of the others, the said data constituting instructions in reference to the use of said sheets, and each sheet bearing further appropriately designated spaces for the entry of information relative to the material the shipment of which is to be expedited.

2. An instrument for use in the expediting of the movement of material, comprising a plurality of sheets having indicia to distinguish one from another, each of said sheets bearing data adapted to register with that of the others, the said data constituting instructions in reference to the use of said sheets, and said sheets bearing further appropriately designated spaces for the entry of information relative to shipment of material which is to be expedited.

3. An instrument for use in the movement of material, comprising a plurality of sheets having letters to distinguish one from another, each of said sheets bearing data in registry with that of the others, the said data constituting instructions in reference to the use of said sheets upon one face thereof and further bearing appropriately designated spaces upon the other face thereof for the entry of information in reference to the time and place desired for delivery of the material which is to be expedited, appropriately designated spaces for the entry of the kind of material shipment of which is to be expedited and the time and place when the shipment will be made, and appropriately designated spaces for the entry of the time and place in which the shipment is actually made.

4. An instrument for use in the expediting of the movement of material, comprising a plurality of sheets having means to distinguish one from another, each of said sheets bearing data similar to that of the others, the said data constituting instructions in reference to the use of said sheets, and each sheet bearing further appropriately designated spaces for the entry of information relative to the material the shipment of which is to be expedited.

5. An instrument for use in the expediting of the movement of material, comprising a plurality of sheets having indicia to distinguish one from another, each of said sheets bearing data in registry with that of the other sheets, said data being distributed upon both faces of the sheet, one face bearing data constituting instructions in reference to the use of said sheet and the other face bearing appropriately designated spaces for the entry of information in reference to the kind and quantity of material and place and time of the delivery desired; appropriately designated spaces for the entry of data in reference to the conditions prevailing at the time and place from which shipment will be made and appropriately designated spaces for the entry of data in reference to the time and manner in which shipment is actually made.

6. An instrument for use in the expediting of the movement of material, comprising a plurality of sheets having indicia to distinguish one from another, each of said sheets bearing data in registry with that of the other sheets, a portion of said data constituting instructions in reference to the use of said sheets and the remaining portion constituting data in association with appropriately designated spaces for the entry of information in reference to the time, the amount of material and the time and place of delivery desired; appropriately designated spaces for the entry of the date and point from which shipment will be made and conditions prevailing at that point, and appropriately designated spaces for the entry of data in reference to the date of shipment and manner in which shipment is actually made.

In testimony whereof I hereunto affix my signature this 19 day of December, 1925.

PAUL D. SATCHWELL.